US012009570B2

(12) United States Patent
Dardenne et al.

(10) Patent No.: US 12,009,570 B2
(45) Date of Patent: Jun. 11, 2024

(54) VEHICLE ANTENNA GLAZING

(71) Applicant: AGC GLASS EUROPE, Louvain-la-Neuve (BE)

(72) Inventors: Xavier Dardenne, Grez-Doice (BE); Hà Bui-Van, Louvain-La-neuve (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 232 days.

(21) Appl. No.: 17/622,123

(22) PCT Filed: Jun. 25, 2020

(86) PCT No.: PCT/EP2020/067916
§ 371 (c)(1),
(2) Date: Dec. 22, 2021

(87) PCT Pub. No.: WO2020/260508
PCT Pub. Date: Dec. 30, 2020

(65) Prior Publication Data

US 2022/0263218 A1 Aug. 18, 2022

(30) Foreign Application Priority Data

Jun. 26, 2019 (EP) .................................... 19182538

(51) Int. Cl.

| | |
|---|---|
| ***H01Q 1/12*** | (2006.01) |
| ***H01Q 1/22*** | (2006.01) |
| ***H01Q 5/357*** | (2015.01) |
| ***H01Q 9/04*** | (2006.01) |

(52) U.S. Cl.
CPC ......... *H01Q 1/1271* (2013.01); *H01Q 1/2291* (2013.01); *H01Q 5/357* (2015.01); *H01Q 9/0421* (2013.01)

(58) Field of Classification Search
CPC .. H01Q 1/12; H01Q 1/32; H01Q 1/40; H01Q 1/1271; H01Q 1/2291; H01Q 5/371; H01Q 5/378; H01Q 5/357
See application file for complete search history.

(56) References Cited

U.S. PATENT DOCUMENTS

| | | | | |
|---|---|---|---|---|
| 7,498,993 | B1 * | 3/2009 | Lee | H01Q 21/30 343/810 |
| 2006/0249705 | A1 * | 11/2006 | Wang | C04B 35/2683 501/141 |
| 2010/0092952 | A1 * | 4/2010 | Ju | C12Q 1/6869 435/6.16 |
| 2011/0068983 | A1 | 3/2011 | Koide et al. | |
| 2016/0256448 | A1 * | 9/2016 | Bair | A61K 31/47 |
| 2017/0033433 | A1 * | 2/2017 | Winkelmann | H01Q 13/106 |
| 2017/0324138 | A1 * | 11/2017 | Talty | H01Q 1/1271 |
| 2020/0134773 | A1 * | 4/2020 | Pinter | G01N 21/8806 |
| 2021/0299879 | A1 * | 9/2021 | Pinter | B25J 9/1697 |
| 2022/0330591 | A1 * | 10/2022 | Fotsing | C07D 409/14 |

OTHER PUBLICATIONS

International Search Report dated Sep. 15, 2020 in PCT/EP2020/067916 filed on Jun. 25, 2020, 3 pages.

* cited by examiner

*Primary Examiner* — Lam T Mai
(74) *Attorney, Agent, or Firm* — Oblon, McClelland, Maier & Neustadt, L.L.P.

(57) ABSTRACT

A vehicle antenna glazing that includes an antenna element. The antenna element is a WIFI antenna working at a 2.41-2.48 GHz frequencies, and the antenna element includes a planar radiating element and a planar ground element, both connected to a co-axial connector.

12 Claims, 3 Drawing Sheets

VEHICLE ANTENNA GLAZING

BACKGROUND OF THE INVENTION

Field of the Invention

The present invention relates to a WiFi antenna integrated into a vehicle glazing and more particularly into a vehicle's windshield for OTA (Over the Air) communication between the vehicle and an infrastructure, such as the residential gateway at the driver's home. For instance, when the car is parked in proximity to the driver's home, automatic software updates could be sent to the car through the WiFi access point located in the home. As the orientation of the car with respect to the home gateway is unpredictable, the antenna radiation pattern should be as uniform as possible over the 360° of azimuth.

Being integrated into a glazing, the WiFi antenna can be as well used to provide WiFi coverage inside the vehicle.

Also, being integrated into a glazing and more particularly into a windshield, the antenna should be either hidden along the border of the glazing and more particularly of the windshield, hidden behind the central bracket, or made invisible or barely visible as to minimize intrusion into the driver's field of view.

DESCRIPTION OF THE RELATED ART

Two main types of solution exists for WiFi communications outside of the vehicle.

The first one is based on antennas located inside the vehicle, typically behind the dashboard, which are already used for WiFi LAN (Local Area Network) inside the vehicle. Hence, the same antennas are used for inside, and outside WiFi coverage. The main problem of this approach is that, while the coverage inside the vehicle can be excellent, the outside coverage is very poor, mainly due to the antenna location. There are indeed many metallic parts between the antennas and the outside medium, in all directions.

The second option consists in using external antennas, typically located inside the bumpers or the side mirrors. The drawback of this approach is again a masking effect of the car body. For instance, an antenna located in the from bumper will radiate correctly towards the front of the car, but radiation towards the back is completely blocked by the metallic car body, and is therefore very poor. Installing an antenna into a side mirror provides good front and back radiation, but is very asymmetric along the left-right axis, again because of the masking effect of the car body. For instance, an antenna located in the right side mirror will have very poor radiation level on the left side of the car. This is illustrated in FIG. 1. To overcome this issue, OEMs typically resort to two antennas. For instance, one in each side mirror. This is indeed a good technical solution, but is very expensive, as there are two antennas instead of one, and their signals must be combined with additional electronic components (mixers, etc. . . . ). Therefore, although this solution would be acceptable for expensive premium cars, it is not the case for lower or middle class vehicles, for which a single antenna system is much simpler, cheaper, and therefore preferable.

BRIEF SUMMARY OF THE INVENTION

Thus, the present invention proposes an easy solution consisting in embedding the WiFi antenna into the vehicle's glazing. Although this solution could technically be implemented in any of the vehicle glazing, the antenna should preferably be located in the windshield, as the WiFi transceiver is usually located behind the dashboard. The cabling length between the antenna structure and this transceiver is therefore reduced, which limits RF losses as well as cost.

Placing the antenna in a glazing and more particularly in the windshield ensures optimal coverage at the front of the vehicle, and also limits the masking effect towards the back. Depending on how the antenna radiation pattern is shaped, the proposed solution can then offer similar or better performance than the two-antenna solutions in the side mirrors, either towards the front or back direction, while keeping an acceptable level of performance in the opposite direction. In the direction with the weakest radiation, it is better than a dashboard antenna, although usually not as good as the side mirrors solution, but at a much lower price. The windshield integrated antenna can then be designed to maximize radiation in the desired direction. In prior art windshield integrated an antenna element, the radiation is slightly lower towards front and back, compared to an antenna integrated into the known side mirrors enclosure. However, it is much more uniform over 360° azimuth, and much better towards the side of the car opposite to the side mirror containing the antenna.

Thus, the present invention concerns a vehicle antenna glazing comprising an antenna element.

According to the present invention, the antenna element is a WIFI antenna working at a 2.41-2.48 GHz frequencies, the antenna element comprising a planar radiating element connected to a co-axial connector.

According to the present invention, the antenna element comprises further a planar ground element, and a planar feeding structure.

According to the present invention, the planar radiating element, ground element, and feeding structure may be made of planar conducting material.

According to the present invention, the ground element is preferably located between the radiating element and the vehicle glazing edge. This enables to minimize the effect of the car body on the radiating element, and hence, minimize antenna detuning caused by the proximity of the car body. In order to maximize this detuning protection as well as keep the antenna element confined close to the edge of the glazing, the larger dimension of the ground element is essentially parallel to the glazing edge.

According to the present invention, the whole antenna structure is sticked to the glazing thanks to an adhesive layer located between the glazing and the planar antenna element conducting material.

In a preferred embodiment of the present invention, the vehicle glazing is a laminated glazing. In a more preferred embodiment, the vehicle glazing is a windshield. The planar radiating element is preferably provided on face 4 (P4) i.e. the outer face of the inner glass of the windshield, on which it is sticked thanks to an adhesive layer.

According to another embodiment of the present invention, the planar radiating element is preferably provided on face 4 (P4) i.e. the outer face of the inner glass of the windshield, the planar radiating element being silver print planar radiating element.

According to the present invention, the glazing can be a flat or curved panel to fit with the design of the car. The pane of glass can be tempered or laminated to respect with the specifications of security. In case of laminated glazing, the latter can comprise a metallic coating on at least one of its inner faces, for instance an infrared rejection coating. A heating system, based on a conductive coating or a network of wires or silver print on a pane of glass, can be applied on the pane of glass to add a defrosting function for example. Also, the pane of glass can be a clear glass or a colored glass, tinted with a specific composition of the glass or by applying a coating or a plastic layer for example.

According to an embodiment of the present invention, the planar radiating element material can be a thin metal layer, -based coating, a silver print, or a fine mesh of thin conducting wires (behaving as a fully conducting surface, if the mesh is fine compared to the wavelength).

The dimensions of the radiating element are chosen such that it radiates efficiently at the WiFi frequencies. Preferably in a single band (2.4 GHz band: 2.41-2.48 GHz), but it could as well be a wide band or multi-band element (covering the 2.4 GHz band and all or part of the 5 GHz band: 5.1-5.8 GHz).

The shape and dimensions of the radiating element are chosen so as to optimize the radiation pattern, i.e. maximize the coverage outside of the vehicle, and maximize radiation uniformity in azimuth around the vehicle.

The antenna being typically located along the edges of a glazing, i.e. close to the metallic car body, the shape and dimensions of the antenna will be tailored so as to minimize the effect of the car body proximity. In particular, the radiating element type should be chosen among those providing good radiation characteristics in close proximity of a large ground plane.

The radiating element can also potentially include at least one parasitic element, whose purpose is to shape the radiation pattern according to requirements.

The radiating element can also potentially include at least one slot that is etched in the conducting material. The slot shape can be any usual shape used in slot antennas, that is compatible with the manufacturing process (rectangular, circular, H, U, . . . ). The at least one slot can be used to increase the frequency bandwidth or create additional bands, in case of a multi-band antenna. Bandwidth widening is typically useful to mitigate antenna detuning caused by the proximity of the metallic car body.

According the present invention, the antenna element comprises further a planar feeding structure. The planar feeding structure can be used to transport efficiently the radio frequency (RF) signal from the connector to the radiating element, in case the connector cannot be directly connected to the radiating element. The feeding structure can be any suitable RF transmission line, such as a microstrip line or a coplanar waveguide, or a simple slotted structure between a ground element or an extension thereof, and a radiating element.

According to the present invention, the antenna element is connected to a coaxial cable connector, more particularly a coaxial connector, is used to make the transition from the coaxial output of the transceiver to the radiating element, or its feeding structure. The ground element or an extension thereof is connected to the ground conductor of the connector (i.e. the outer conductor of the coaxial connector), while the radiating element is connected to the signal conductor of the connector (i.e. the inner conductor of the coaxial connector). This connector should comply with the typical mechanical requirements for automotive glazing antennas (traction resistance, etc. . . . ). The coaxial cable allow to connect the antenna element to a power system.

Being located in the windshield, the antenna should not interfere with the driver's vision.

The antenna system should then be located preferably along the edges of the windshield, typically hidden behind the internal plastic covers along the A-pillars or the central bracket, such as it is invisible, or mostly invisible from the inside.

Also, it should preferably be located behind the black ceramic, classically used to mask anesthetic elements, such as it is invisible, or mostly invisible from the outside.

The antenna system or a part of the antenna system could be located elsewhere, provided that it remains invisible or mostly invisible. For example, the antenna element is made of transparent, or almost transparent conducting material (coating, fine mesh of very thin embedded wires, . . . ).

BRIEF DESCRIPTION OF THE SEVERAL VIEWS OF THE DRAWINGS

Other advantages, as well as appropriate achievements and developments of the invention are developed in the claims and in the description of embodiments with reference to the figures which show:

DETAILED DESCRIPTION OF THE INVENTION

For avoidance of doubt, the terms "external" and "internal" refer to the orientation of the glazing during installation as glazing in a vehicle.

Also for avoidance of doubt, the present invention is applicable for all means of transport such as automotive, train, plane . . . .

For simplicity, the numbering of the glass sheets in the following description refers to the numbering nomenclature conventionally used for glazing. Thus, the face of the glazing in contact with the environment outside the vehicle is known as the side 1 and the surface in contact with the internal medium, that is to say the passenger compartment, is called face 2. For a laminated glazing, the glass sheet in contact with the outside environment the vehicle is known as the side 1 and the surface in contact with the internal part, namely the passenger compartment, is called face 4.

Figure 1A:
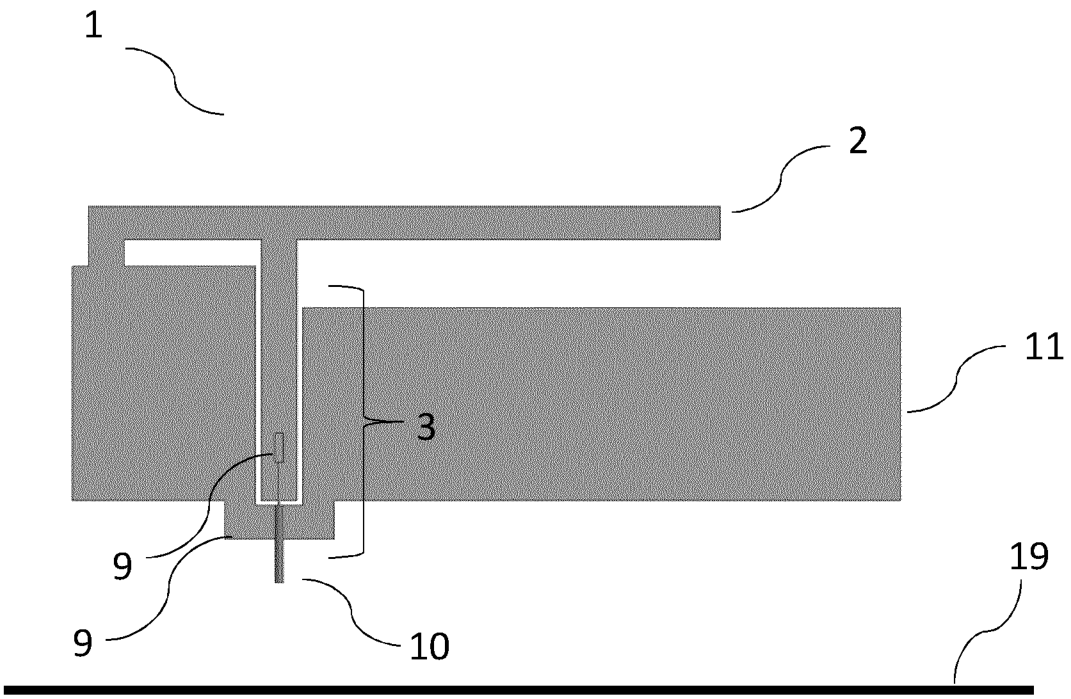
FIG. 1 to FIG. 4 are examples of implementing particular embodiments of the present invention.
Figure 1B:
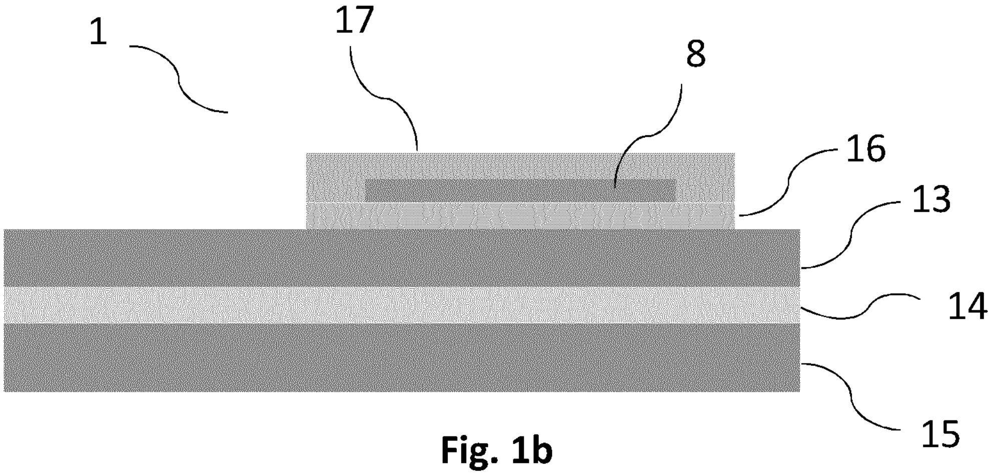

FIGS. 1*a* and 1*b* represent an embodiment of the present invention. The antenna element 1 is a single band, coplanar waveguide (CPW) fed 3, PIFA (Planar Inverted F Antenna) antenna. The radiating element 2 is made of, for example, a thin strip of conducting material (can be metal deposition or thin wire). The feeding structure 3 is the CPW structure, going through the ground element (11), the latter being essentially parallel to the closest glazing edge (19).

The antenna element 1 may be implemented in a laminated glazing, more particularly a windshield. The glazing may comprise two glass sheets for example 2.1 mm thick for the external glass sheet (15) and 1.6 mm thick for the internal glass sheet (13) and joined by means of a thermoplastic sheet (14) of 0.76 mm made of, for example, polyvinylbutyral. According the present invention, the antenna element 1 is provided out of the driver's vision and more particularly in a hidden zone. The conductive material (8) comprising the radiating element (2), ground element (11) and feeding structure (3) is sticked to the glazing thanks to an adhesive layer (16), and optionally covered by a protective layer (17) made, for instance, of some thin plastic sheet.

A connector 9 for a coaxial cable is used to make the transition between a coaxial cable 10 and the feeding structure (3). The connector (9) connects the inner conductor of the coaxial cable (10) to the feeding structure (3), and the outer conductor of the coaxial cable (10) to the ground element (11).

In this particular case, the antenna structure 1 should be preferably located in face 4, also called P4, as the connector 9 cannot be laminated because of its thickness (too thick). The connector 9 should then be hidden behind plastic covers inside the car (A-pillar or central bracket).

Figure 2:
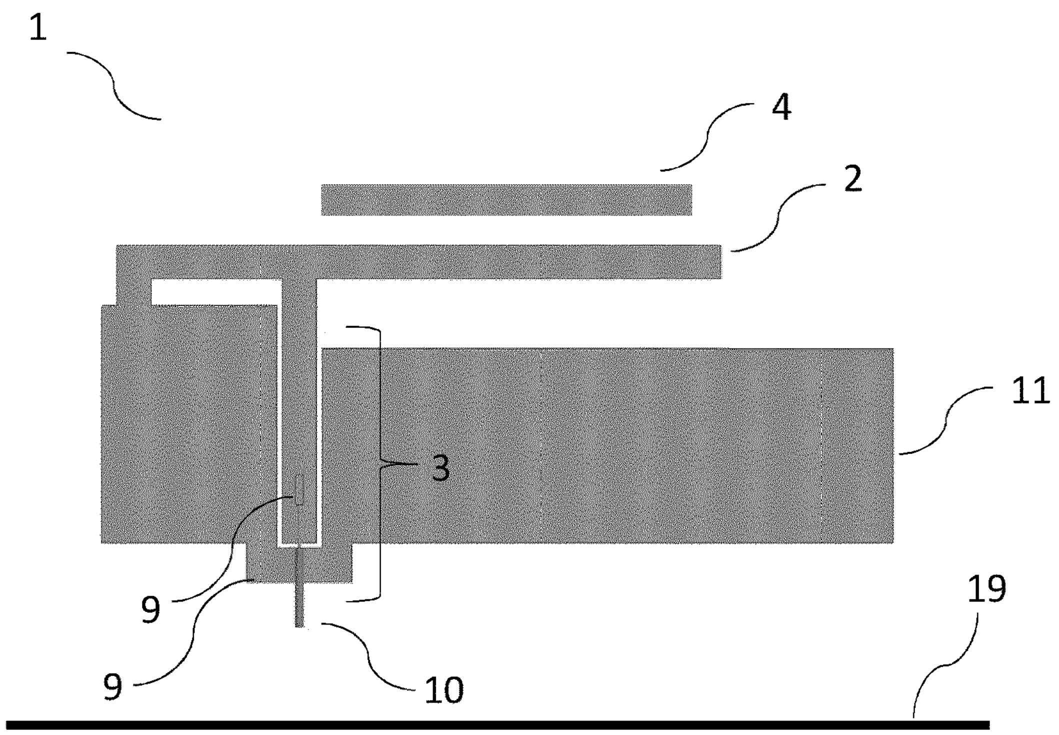

According to another embodiment of the present invention as shown in FIG. 2, a planar CPW-fed (3) antenna with a parasitic element 4 may be used. At least one parasitic element 4 can be added close to the main radiating element 2, in order to shape the radiation pattern according to the application requirements, or to create additional resonances, providing a multi band behavior. This at least one parasitic element 4 is electrically isolated from the main radiating element 2 (not connected to it). The at least one parasitic element 4 is made of conducting material, which can be the same or of another type than the main radiating element 2.

Figure 3:
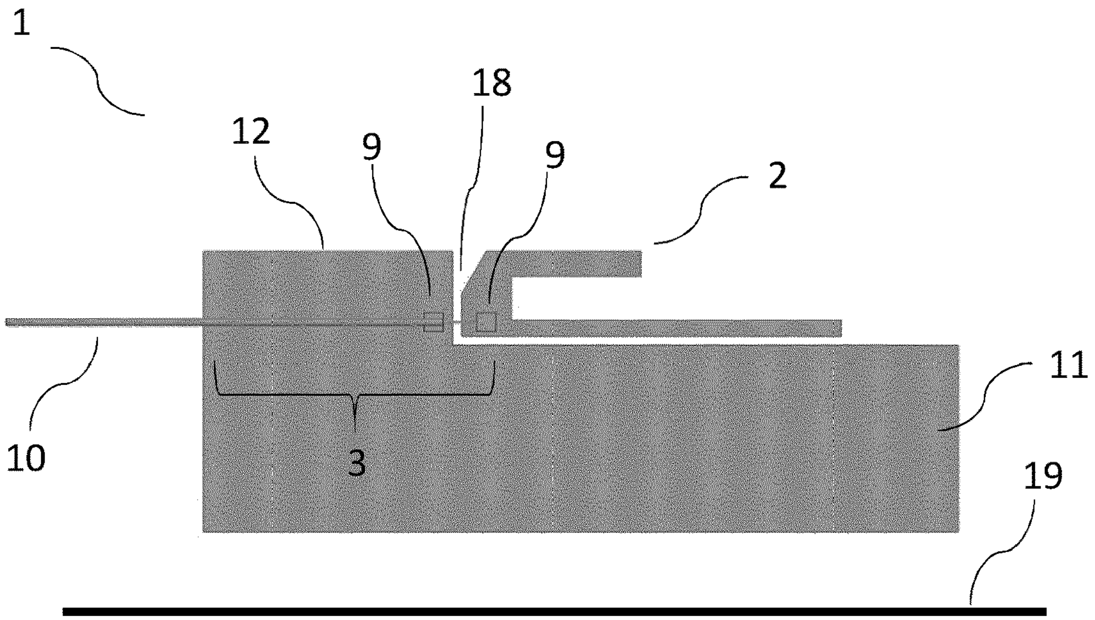

According to another embodiment of the present invention, illustrated in FIG. 3, representing a planar folded monopole antenna, the feeding structure 3 may be implemented as a gap (18) between the radiating element (2) and the ground element, or an extension (12) thereof.

Figure 4A:
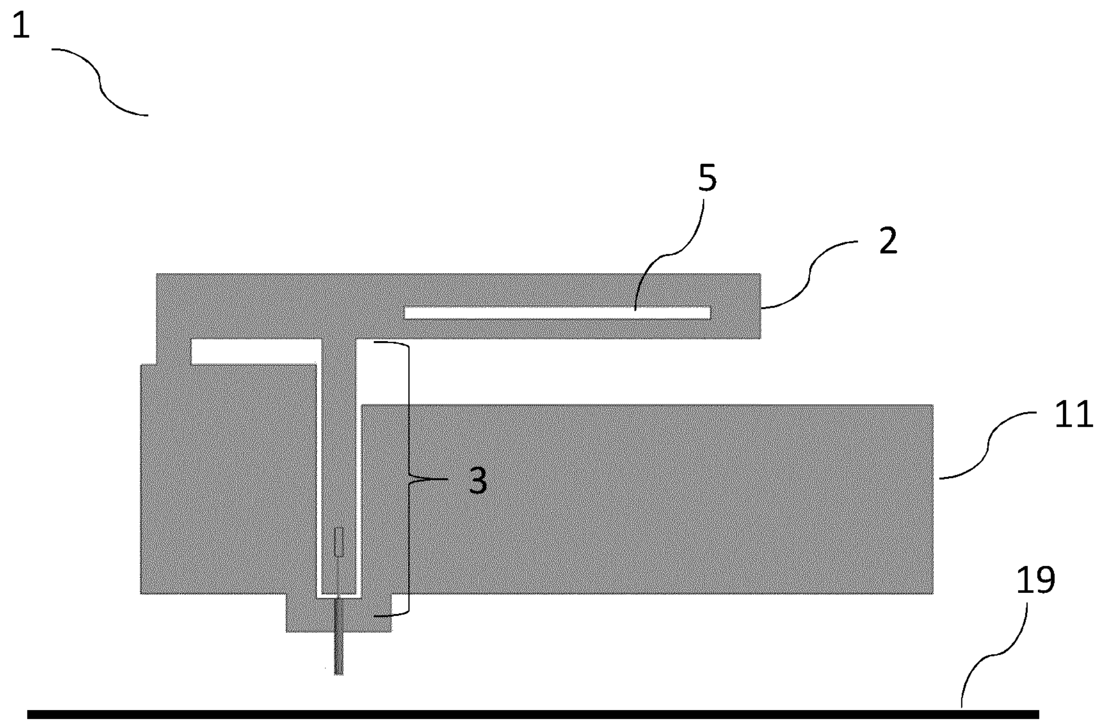
Figure 4B:
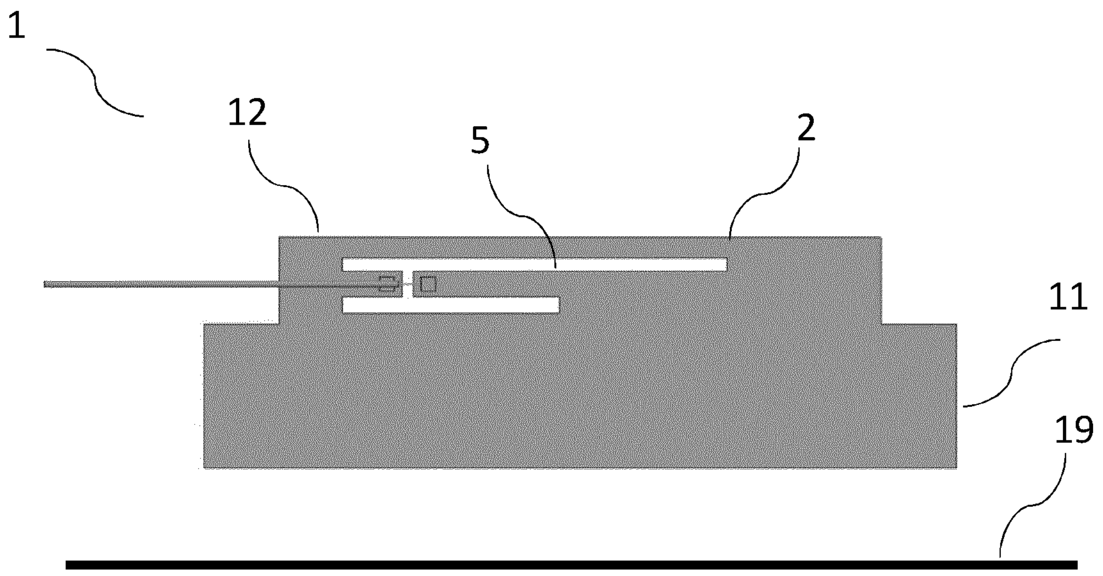

According to another embodiment of the present invention and as shown in FIGS. 4*a* and 4*b*, slots (5) may be used. In these examples, slots are etched either in the radiating element (2) or the ground element (11) or an extension thereof (12), respectively. FIG. 4*a* describes a CPW-fed PIFA antenna, with slots (5) etched in the main radiating element (2), in order to tune the antenna impedance or create new resonances and open new frequency bands. In FIG. 4*b*, the slots (5) are etched in an extension (12) of the ground plane (11) and are used as the main radiation source.

According to an embodiment of the present invention, a black enamel, commonly used to mask all not aesthetics elements like connectics, sensors . . . may be provided on face 2. It is understood that the enamel or any masking band may be provided in face 2 and/or face 3 and/or face 4.

This embodiment relates to a windshield, ie a laminated glazing, however, it could be transposed to a glazing made in one pane of glass like sidelite, backlite . . . .

The antenna element (1) according to the present invention is compatible with coated glazing, such as infrared rejection glazing, or heated coated glazing and with heated wired glazing. Both glazing are well-know and commonly used today, however, they may interfere with the efficiency of the antenna element. Therefore, in a preferred embodiment, when applied on a glazing comprising a metallic coating, this coating may be partially removed in the glazing area located just above the antenna element. This local decoating enables to recover most of the antenna performance. In a more preferred embodiment, the decoated surface may take the form of a regular grid made of an array of intersecting thin decoated lines. The spacing between parallel lines of the grid should be smaller than the wavelength, preferably smaller the quarter of the wavelength.

The invention claimed is:

1. A vehicle antenna glazing comprising:

an antenna element, wherein the antenna element is a wide band or multi-band WIFI antenna working at 2.41-2.48 GHz and 5.1-5.8 GHz frequencies, the antenna element comprising a planar radiating element, and a planar ground element, both connected to a co-axial connector, the antenna element being a planar inverted F antenna (PIFA) or a planar folded monopole antenna.

2. The glazing according to claim 1, wherein the planar ground element is located between the radiating element and a closest glazing edge, and extends essentially parallel to the closest glazing edge.

3. The glazing according to claim 1, wherein the antenna element further comprises a planar feeding structure.

4. The glazing according to claim 1, wherein the planar radiating element and ground element are made of a planar conducting material.

5. The glazing according to claim 3, wherein the planar radiating element, the planar ground element, and the planar feeding structure are adhered to the glazing by a thin adhesive layer.

6. The glazing according to claim 1, wherein the planar radiating element further comprises at least one parasitic element.

7. The glazing according to claim 4, wherein the planar radiating element, the ground plane element or extension thereof further comprises at least one slot that is etched in the conducting material.

8. The glazing according to claim 1, wherein the glazing is a laminated windshield.

9. The glazing according to claim 8, wherein the antenna element is provided on an outer face of inner class of the windshield.

10. The glazing according to claim 1, wherein the glazing is a coated or heated coated windshield.

11. The glazing according to claim 10, wherein a grid pattern is decoated locally above the antenna element.

12. The glazing according to claim 4, wherein the planar conducting material includes a thin metal-based foil, a silver print, or a fine mesh of thin conducting wires.

* * * * *